US012044369B2

(12) United States Patent
Pritchett

(10) Patent No.: US 12,044,369 B2
(45) Date of Patent: Jul. 23, 2024

(54) MULTI-DIRECTIONAL LIGHT ASSEMBLY

(71) Applicant: TRIPLELITE LLC, Ramona, CA (US)

(72) Inventor: Ronnie Pritchett, Ramona, CA (US)

(73) Assignee: TRIPLELITE LLC, Ramona, CA (US)

( * ) Notice: Subject to any disclaimer, the term of this patent is extended or adjusted under 35 U.S.C. 154(b) by 0 days.

(21) Appl. No.: 17/064,539

(22) Filed: Oct. 6, 2020

(65) Prior Publication Data

US 2021/0231270 A1 Jul. 29, 2021

Related U.S. Application Data

(63) Continuation of application No. 15/285,245, filed on Oct. 4, 2016, now Pat. No. 10,794,549, which is a (Continued)

(51) Int. Cl.
*F21L 4/00* (2006.01)
*F21L 4/02* (2006.01)
(Continued)

(52) U.S. Cl.
CPC ............... *F21L 4/027* (2013.01); *F21L 4/005* (2013.01); *F21L 4/02* (2013.01); *F21L 4/022* (2013.01);
(Continued)

(58) Field of Classification Search
CPC ..... F21V 7/28; F21V 7/24; F21V 3/02; F21V 7/0075; F21V 23/023; F21V 23/0414;
(Continued)

(56) References Cited

U.S. PATENT DOCUMENTS 4,937,713 A 6/1990 Holt et al.
5,077,644 A 12/1991 Schaller et al.
(Continued)

FOREIGN PATENT DOCUMENTS

CN 1902432 A 1/2007
DE 20004105 U1 5/2000
(Continued)

OTHER PUBLICATIONS

International Search Report and Written Opinion dated Aug. 7, 2013 for corresponding International Application No. PCT/US2013/041472 filed May 16, 2013; total 17 pages.
(Continued)

*Primary Examiner* — Gerald J Sufleta, II
(74) *Attorney, Agent, or Firm* — Snell & Wilmer L.L.P.

(57) ABSTRACT

Light assemblies comprise a housing having a chamber, one or more light emitting elements connected with the housing, a transparent cover, and one or more reflectors positioned adjacent the light emitting element. The one or more light emitting elements are interposed between the transparent cover and the one or more reflectors, and the one or more light emitting elements and one or more reflectors operate to provide a multi-directional field of illumination that is 180 degrees or more, e.g., between about 180 to 270 degrees. The transparent cover may have a convex outer surface to facilitate light transmission in side oriented directions. The light assembly may include switches or controls for on/off and/or dimming functions. An example light assembly comprises three light emitting elements in the form of LEDs, and includes three reflectors, wherein the LEDs and reflectors are configured to produce the desired field of illumination.

24 Claims, 7 Drawing Sheets

Related U.S. Application Data continuation of application No. 13/896,226, filed on May 16, 2013, now Pat. No. 9,458,985, which is a continuation-in-part of application No. 13/473,173, filed on May 16, 2012, now Pat. No. 9,534,750.

(51) Int. Cl.

| | |
|---|---|
| ***F21L 4/08*** | (2006.01) |
| ***F21V 3/02*** | (2006.01) |
| ***F21V 7/00*** | (2006.01) |
| ***F21V 7/24*** | (2018.01) |
| ***F21V 7/28*** | (2018.01) |
| ***F21V 23/02*** | (2006.01) |
| ***F21V 23/04*** | (2006.01) |
| *F21V 7/06* | (2006.01) |
| *F21V 7/22* | (2018.01) |
| *F21Y 115/10* | (2016.01) |

(52) U.S. Cl.
CPC ................ *F21L 4/085* (2013.01); *F21V 3/02* (2013.01); *F21V 7/0075* (2013.01); *F21V 7/24* (2018.02); *F21V 7/28* (2018.02); *F21V 23/023* (2013.01); *F21V 23/0414* (2013.01); *F21V 7/06* (2013.01); *F21V 7/22* (2013.01); *F21V 23/026* (2013.01); *F21V 23/04* (2013.01); *F21Y 2115/10* (2016.08)

(58) Field of Classification Search
CPC . F21V 7/06; F21V 7/22; F21V 23/026; F21V 23/04; F21L 4/005; F21L 4/02; F21L 4/022; F21L 4/085; F21Y 2115/10
See application file for complete search history.

(56) References Cited

U.S. PATENT DOCUMENTS

| | | | | |
|---|---|---|---|---|
| 5,353,208 | A | 10/1994 | Moore | |
| 5,558,430 | A | 9/1996 | Booty, Jr. | |
| 5,580,156 | A | 12/1996 | Suzuki et al. | |
| 5,630,661 | A | 5/1997 | Fox | |
| 6,158,874 | A | 12/2000 | Brustein et al. | |
| 6,357,893 | B1 | 3/2002 | Belliveau | |
| 7,214,952 | B2 | 5/2007 | Klipstein et al. | |
| 7,327,254 | B2 | 2/2008 | Chen | |
| 7,387,402 | B1 | 6/2008 | Lui | |
| 7,594,738 | B1 | 9/2009 | Lin et al. | |
| 7,674,003 | B2 | 3/2010 | Sharrah et al. | |
| 7,682,037 | B1 | 3/2010 | Hose et al. | |
| 7,815,337 | B2 | 10/2010 | Grossman | |
| 7,845,827 | B2 | 12/2010 | Tarter et al. | |
| 8,550,654 | B2 | 10/2013 | Olsen | |
| 8,807,785 | B2 | 8/2014 | Ivey et al. | |
| 8,939,603 | B2 | 1/2015 | Huang et al. | |
| 2002/0109986 | A1 | 8/2002 | Siegel | |
| 2003/0107894 | A1 * | 6/2003 | Mize | H01L 33/54 257/E33.059 |
| 2003/0184999 | A1 | 10/2003 | Neiser | |
| 2004/0095757 | A1 | 5/2004 | Hsien | |
| 2004/0136184 | A1 | 7/2004 | Cheng | |
| 2004/0136185 | A1 | 7/2004 | Sharrah | |
| 2004/0156202 | A1 * | 8/2004 | Probst | F21V 7/04 362/341 |
| 2004/0170014 | A1 * | 9/2004 | Pritchard | F21V 15/015 362/202 |
| 2004/0190286 | A1 | 9/2004 | Chapman | |
| 2005/0007777 | A1 * | 1/2005 | Klipstein | H05B 45/38 362/244 |
| 2005/0088843 | A1 | 4/2005 | Chapman | |
| 2006/0056176 | A1 | 3/2006 | Au et al. | |
| 2006/0067077 | A1 | 3/2006 | Kumthampinij et al. | |
| 2006/0262526 | A1 | 11/2006 | Dubois | |
| 2007/0064415 | A1 | 3/2007 | Wood | |
| 2007/0153512 | A1 | 7/2007 | Hendrie | |
| 2007/0159816 | A1 | 7/2007 | Bayat et al. | |
| 2007/0177378 | A1 | 8/2007 | Wu et al. | |
| 2007/0236931 | A1 | 10/2007 | Chien | |
| 2007/0258235 | A1 * | 11/2007 | Brockel | F21V 7/04 362/190 |
| 2008/0180946 | A1 | 7/2008 | Kim et al. | |
| 2008/0205036 | A1 | 8/2008 | Tarter et al. | |
| 2008/0211428 | A1 * | 9/2008 | Bayat | F21V 23/0414 315/299 |
| 2009/0080185 | A1 * | 3/2009 | McMillan | F21V 29/70 362/231 |
| 2009/0189541 | A1 | 7/2009 | Crawford et al. | |
| 2010/0085744 | A1 * | 4/2010 | Bertken | F21L 4/022 362/184 |
| 2010/0172135 | A1 | 7/2010 | Holder et al. | |
| 2010/0177508 | A1 | 7/2010 | Maglica | |
| 2010/0254122 | A1 | 10/2010 | Bayat et al. | |
| 2011/0170280 | A1 | 7/2011 | Soto et al. | |
| 2012/0026732 | A1 | 2/2012 | Fricke | |
| 2012/0081915 | A1 | 4/2012 | Fotte et al. | |
| 2013/0141908 | A1 | 6/2013 | Rodriguez et al. | |
| 2013/0194796 | A1 | 8/2013 | Progl | |
| 2013/0301257 | A1 | 11/2013 | Britt et al. | |
| 2013/0308307 | A1 | 11/2013 | Pritchett | |

FOREIGN PATENT DOCUMENTS

| | | | |
|---|---|---|---|
| DE | 20206201 | U1 | 8/2002 |
| WO | 2005057080 | A2 | 6/2005 |
| WO | 2008157772 | A1 | 12/2008 |

OTHER PUBLICATIONS

International Preliminary Report on Patentability dated Nov. 18, 2014 for corresponding International Application No. PCT/US2013/041472 filed May 16, 2013; total 13 pages.
Energy Star® Program Requirements for Integral LED Lamps Partner Commitments (incorporated-by-reference by Progl) (Year: 2010).

* cited by examiner

MULTI-DIRECTIONAL LIGHT ASSEMBLY

CROSS-REFERENCE TO RELATED PATENT APPLICATIONS

This patent application is a continuation of and claims priority to U.S. patent application Ser. No. 15/285,245 filed Oct. 4, 2016, now U.S. Pat. No. 10,794,549 issued Oct. 6, 2020, which is a continuation of U.S. application Ser. No. 13/896,226, filed May 16, 2013, now U.S. Pat. No. 9,458,985, issued Oct. 4, 2016, which is a continuation-in-part of U.S. patent application Ser. No. 13/473,173 filed on May 16, 2012, now U.S. Pat. No. 9,534,750 issued Jan. 3, 2017, which applications are herein incorporated by reference in their entirety.

FIELD

Light assemblies as disclosed herein are specifically engineered to emit light in a manner providing a desired multi-directional field of illumination, wherein the light emitted may also have different levels of intensity.

BACKGROUND

Example light assemblies known in the art include those that are portable, and those that are stationary. Examples of known portable light assemblies include handheld or otherwise-held, mounted or supported lights such as flashlights. Such known flashlights are normally provided with a reflector having rotational symmetry. That is, the reflector has a shape formed by rotating a generatrix along the longitudinal axis passing through the bulb of the flashlight. Such flashlights are configured such that the reflector operates to project light emitted from a light source such as a light bulb in a forward direction, i.e., out the front and through a lens or cover of the flashlight.

U.S. Pat. No. 7,387,402 discloses a multiple lens LED flashlight which provides one or more wide angle projections of light as well as a concentrated light beam. Sets of LEDs are mounted to separate circuit boards. U.S. Pat. No. 5,630,661 discloses a flashlight utilizing halogen lamps having variable fields of illumination with adjustably positioned lens.

Other types of known light assemblies include those that may be mounted on a device, object, vehicle or the like, to project a light beam outwardly in front of the device, object, or vehicle for a desired purpose.

While such known light assemblies are useful for the purpose of assisting a user see what is directly in front or forward of the assembly, such devices fail to enable a user to experience an expanded field of illumination where such may be desired or helpful. Accordingly, it is desired that a light assemblies be constructed and engineered in a manner that will provide an expanded field of illumination for a user to address the yet unmet needs of certain end-use applications.

SUMMARY

Light assemblies as disclosed herein comprise a housing having a chamber disposed therein, a light emitting element connected with the housing, a transparent cover positioned adjacent the light emitting element, a reflector positioned adjacent the light emitting element. The light emitting element is interposed between the transparent cover and the reflector, and the light emitting element and reflector operate to provide a multi-directional field of illumination that at least about 90 degrees, in the range of from about 120 to 270 degrees, preferably greater than about 180 degrees, and in some instance up to about 360 degrees.

In an example, the transparent cover has a convex outer surface to facilitate light transmission in side oriented directions. The light assembly may comprise more than one light emitting element, and more than one reflector. In an example, the light assembly may comprise three light emitting elements and three reflectors, wherein two of the light emitting elements are positioned adjacent opposed sides of the housing, and wherein a third light emitting element is interposed therebetween. In such example, first reflector may be configured to direct light emitted from a respective first light element outwardly in a first side-oriented direction relative to the housing, a second reflector may be configured to direct light emitted from a second light element outwardly in a forward-oriented direction relative to the housing, and a third reflector may be configured to direct light emitted from a third light element outwardly in a second side-oriented direction relative to the housing, wherein the first and second side oriented directions are opposed from one another.

In an example the light assembly is a flashlight comprising at least three light emitting bulbs within reflectors which direct light either to the sides or to the front where the light can also be emitted in at least 180 degrees. A dimmer switch for each bulb is provided whereby the light intensity is controlled for each bulb depending upon a direction required to be used.

Light assemblies as disclosed herein provide multiple directions of light emission and intensity.

Light assemblies as disclosed herein emits light to one or two sides.

Light assemblies as disclosed herein comprises reflectors that capture and redirect light in a preselected beam.

These and other objects and advantages of light assemblies as disclosed herein will become apparent from a reading of selected embodiments together with the drawings.

BRIEF DESCRIPTION OF THE DRAWINGS

These and other features and advantages of light assemblies as disclosed herein will be appreciated as the same becomes better understood by reference to the following detailed description when considered in connection with the accompanying drawings wherein.

DESCRIPTION

Light assemblies as disclosed herein are constructed having a housing adapted for accommodating hand-held operation and use, or for mounting on a device or object, such as called for by the particular end-use application. Example embodiments of such light assemblies include and are not limited to those adapted for use as a flashlight, a home or dwelling light, a light assembly attached to a vehicle, boat or plane, a light assembly that can be worn by a user, a helmet light assembly, a light assembly adapted to be mounted on an object such as a gun or the like. Such light assemblies as disclosed herein are specially constructed to produce a field of illumination therefrom that is greater than about 90 degrees, in the range of from about 120 to 270 degrees, and preferably about 180 degrees or more using a combination of one or more light emitting elements and one or more reflectors.

Figure 1:
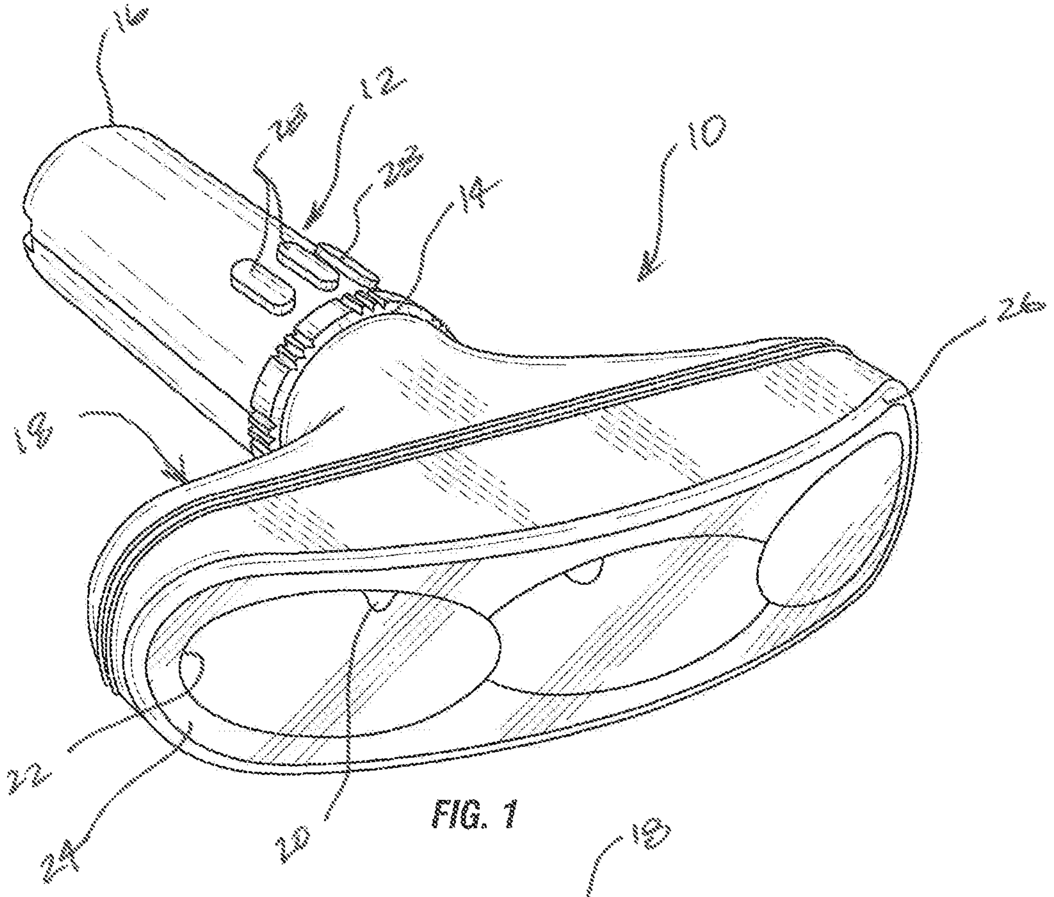
FIG. 1 is a perspective view of an example light assembly as disclosed herein.
Figure 3:
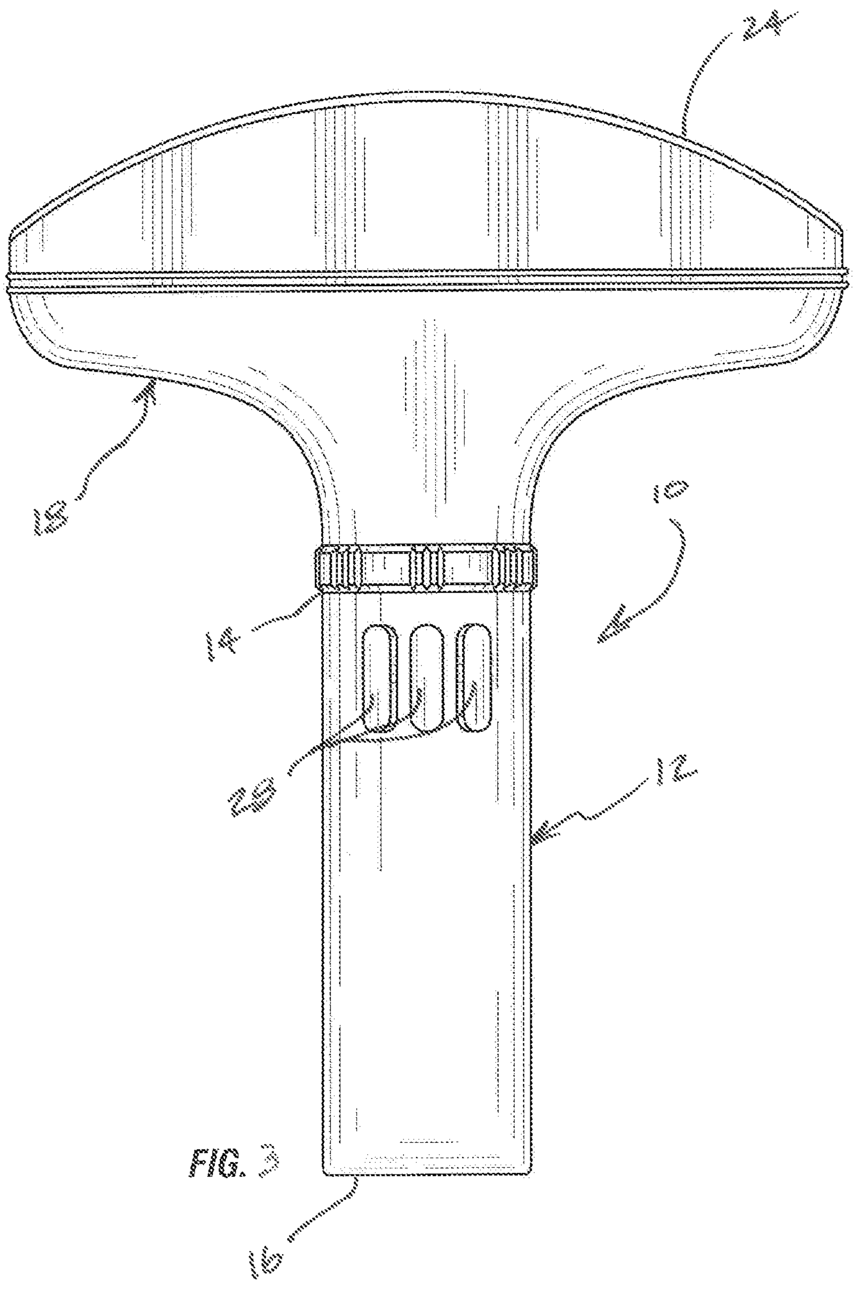
FIG. 3 is a top view of the light assembly of FIG. 1.

FIGS. 1 and 3 illustrate an example light assembly 10 having a generally cylindrical housing 12 adapted to be held by a user for use as a flashlight or the like. The housing can be made from a suitably rigid material, such as polymeric or plastic material, or a metallic material. The housing 12 comprises a hollow chamber sized to accommodate one or more batteries or portable power sources therein (not shown), and extends axially from a front end 14 to a rear end 16.

As illustrated, the light assembly comprises a bulb housing 18 that is connected with the housing 12 at end 14. If desired, the light assembly can be constructed having a unitary housing that is configured to accommodate placement of the portable power source and light emitting elements therein. In this example, the bulb housing 18 is connected with the housing 12 by conventional means, wherein such attachment may be releasable or fixed attachment. In an example, the bulb housing is connected to the housing by releasable attachment means, such as by threaded connection or the like. The end 14 may be configured having a flat or planar surface that can enable the light assembly to be positioned standing on the 14 to project the field of illumination upwards, e.g., towards a ceiling when used within a house or dwelling in the event of an AC power loss or the like.

As best shown in FIG. 3, the bulb housing 18 is configured to accommodate placement of one or more light emitting elements 20 therein, and one or more reflectors 22 therein as called for to provide a desired field of illumination through a transparent lens 24 positioned over an elongate open end of the bulb housing 18. In an example, the bulb housing, and the light element(s), reflector(s), and lens are all configured to provide a field of illumination that is greater than about 180 degrees as measured from an axis extending through the housing 12 and bulb housing 18.

Figure 2:
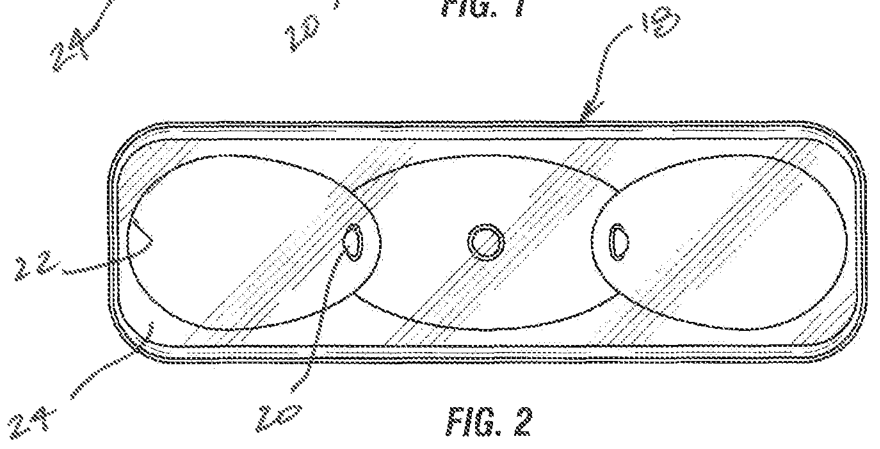
FIG. 2 is a front view of the light assembly of FIG. 1.

In the example illustrated in FIGS. 1 to 3, the light assembly is constructed having three light emitting element 20 that are positioned adjacent one another, e.g., with a first light emitting element positioned in a middle position, a second light emitting element positioned on one side of the first light emitting element, and a third light emitting element positioned on another side of the first light emitting element opposite the second light emitting element. While a particular light emitting element arrangement has been disclosed and illustrated, it is to be understood that light emitting assemblies as disclosed herein may be constructed using a single light emitting element, or using more than one light emitting element that may be other than three. All such light emitting element constructions, configurations, and embodiments are understood to be within the scope of the light assembly as disclosure herein.

For example, light assemblies comprising multiple light emitting elements, such light emitting elements can be selected to provide a different intensity light output and/or a differently colored light output, e.g., the light emitting elements can be selected to produce any desired wavelength of light output that may or may not be in the visible spectrum depending on the particular end-use application. For example, with reference to the example embodiment of FIGS. 1 to 3, the light assembly may be constructed comprising a light emitting element having a great light output intensity in the middle position relative to the two side positioned light emitting elements. The light assembly may be configured with dimming our light output control so the user can control the output intensity of each light emitting element as desired or as called for by a particular end-use application or condition.

In the example illustrated in FIGS. 1 to 3, the light assembly comprises three reflectors, wherein each reflector is positioned adjacent each of the respective first, second and third light emitting elements. The reflectors are configured to work with the light emitting elements to produce the desired field of illumination of greater than about 90 degrees, in the range of from about 120 to 270 degrees, and preferably 180 degrees or more. The example of FIGS. 1 to 3 is configured to provide a preferred multi-directional field of illumination of about 180 degrees or more.

As noted above with respect to the light emitting elements, it is to be understood that light assemblies as disclosed herein may be constructed differently, e.g., comprising a single reflector that works with one or more light emitting elements to produce the desired field of illumination, or comprising multiple reflectors that may or may not be matched to a particular light emitting element and that functions with such light emitting elements to produce the desired multi-directional field of illumination. All such reflector constructions, configurations, and embodiments are understood to be within the scope of the light assembly as disclosure herein.

The types of light emitting elements useful for forming light emitting assemblies as disclose herein can be selected from the group of well know light emitting elements, such as incandescent light bulbs, halogen bulbs, fluorescent bulbs, light emitting diodes (LEDs), and the like. In an example, a LED is used as the light emitting element. As illustrated in FIG. 1, the housing 12 may comprise one or more buttons, switches, or controls 28, wherein such buttons, switches, or controls can be configured to turn on/off the light assembly, or dim one or more of the light emitting elements, and or turn on/off one or more of the light emitting elements, switch operation of the assembly to a blinking mode, and the like depending on the particular end-use application. For example, use of a dimmer function may be desired to extend battery life or the like.

While a particular example has been disclosed and illustrated in FIGS. 1 to 3, having a particular configuration, it is to be understood that the shape of the housing or other elements of light assemblies as disclosed herein may be different than that illustrated as called for by the particular end-use application. For example, instead of having a housing that is cylindrical, light assemblies as disclosed herein may have a housing that is shaped differently for the purpose of attaching with a particular object or device, or for the purpose of accommodating a particular power source, as called for by the end-use applications. Thus, light assemblies as disclosed herein are understood accommodate all such configuration variations.

If desired, light assembly devices as disclosed herein may be constructed comprising an audio element that can be user operated, e.g., by one or more of the switches 28, to provide a desired audible output such as an alarm or the like.

Light assemblies as disclosed herein may comprise means for recharging the portable battery source, e.g., in the form of a charging port or the like configured to accept a cable or other type of input from an AC charger in a home charging application, or a DC charger in a vehicle charging application. Alternatively, for light assemblies as disclosed herein, configured for use with a home, dwelling or other structure having an available AC power source, such light assemblies may be configured to not include a portable power source and to operate on AC power as provided from the object or device that it is mount to comprising the same.

Light assemblies as disclosed herein may be made out of any material suitable to provide a desired level of rigidity. Further, light assemblies as disclosed herein may be constructed to provide waterproof service to permit use underwater or in environments of high humidity. Light assemblies as disclosed herein may be construction to be impact resistant so that in the event the light assembly is dropped or otherwise subjected to an impact force it will continue to operate properly. Light assemblies as disclosed herein may be constructed to the glow in the dark, to thereby make the light assembly easier to locate in a dark environment. Further, light assemblies as disclosed herein may be configured having other features incorporated therein unique to the end-use application. For example, if adapted for use in a military or police application, the light assembly may be configured to include a stun, taser or shock feature and/or to include one or more surface projections or features extending therefrom that may enable the light assembly to be used as a weapon.

Figure 4:
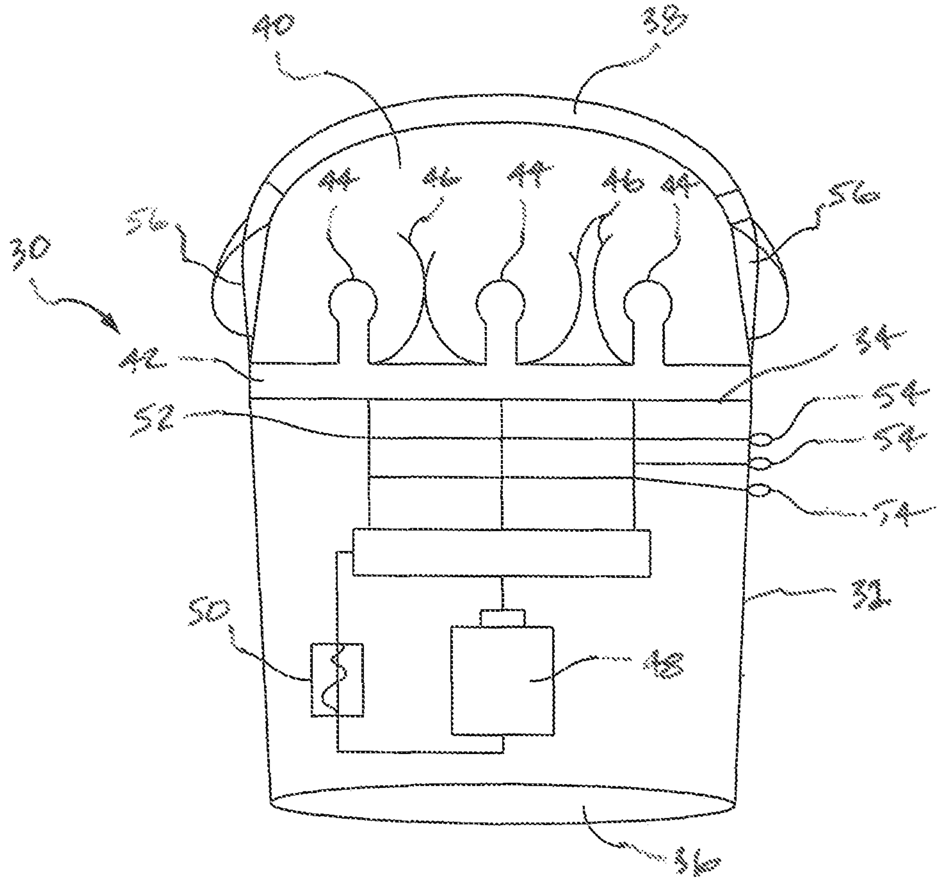
FIG. 4 is a top elevation in cross-section of an example light assembly as disclosed herein.

FIG. 4 illustrates an example light assembly 30 comprising a tubular housing 32 made of any suitable material, such as but not limited to plastic or aluminum. The illustrated elongated housing extends between a large end 32 and a small removable end or cover 34. Alternatively, end 34 may be configured so that it is not removable.

At the large end 34 is a transparent cover 38 defining a chamber 40 sized and configured to receive a bulb housing 42 which contains at least three light emitting bulbs 44 which can have an incandescent filament or preferably LEDs. The LEDs can have any size, shape and color. The bulbs 44 are each housed in reflectors 46. The reflectors 46 extend upwardly around the bulbs 44 to form a socket for the bulbs 44. The two side reflectors direct light to the sides and the middle reflector 46 directs light to the front so that the light is emitted when all three bulbs 44 are activated and the light is emitted to produce the desired multi-directional field of illumination as noted above. The reflectors 46 may be in the shape of a paraboloid or other similar shape to capture and redirect light from a bulb in a preselected beam.

The bulb housing 42 may be removably attached to the housing 32 to provide access to a battery 48 that is disposed within the housing 32.

The bulbs 44 may be oriented at an angle with respect to the reflector 46 or the reflector may be shaped to capture substantially all the light produced by the bulb and redirect it toward a direction in a predetermined pattern.

The reflector may be made from a light reflective material, such as plastic material which is coated on at least one surface with a light-reflecting material such as silver, aluminum or other similar material.

A standard electronic ballast is provided for converting battery voltage from the battery 48 through a dimmer switch 50 to the bulbs 44. Alternatively, there is provided a dimmer switch for each of the bulbs 44 so that the intensity of light emitted can vary with each bulb.

Electrical circuitry 52 is provided for connecting the electronic ballast to the bulbs 44 and the ballast to the electrical contact with the battery 48. The circuitry delivers electrical energy from the power source through the dimmer switch(es) to the light generating assembly. The circuitry in combination with the ballast delivers electrical energy from the power source to the light generating assembly. The circuitry 52 includes on and off switch(es) for controlling the flow of electricity from the battery to the ballast. External electrical input jacks (not shown) may be provided to effect recharging of the battery.

External switches 54 are provided for each of the bulbs.

As seen in FIG. 4, the circuitry 52 can be provided with a single dimmer switch 50 which controls the intensity of light emitted from all the bulbs 44. Also, there are external switches 54 which activate or deactivate the bulbs 44.

Figure 5:
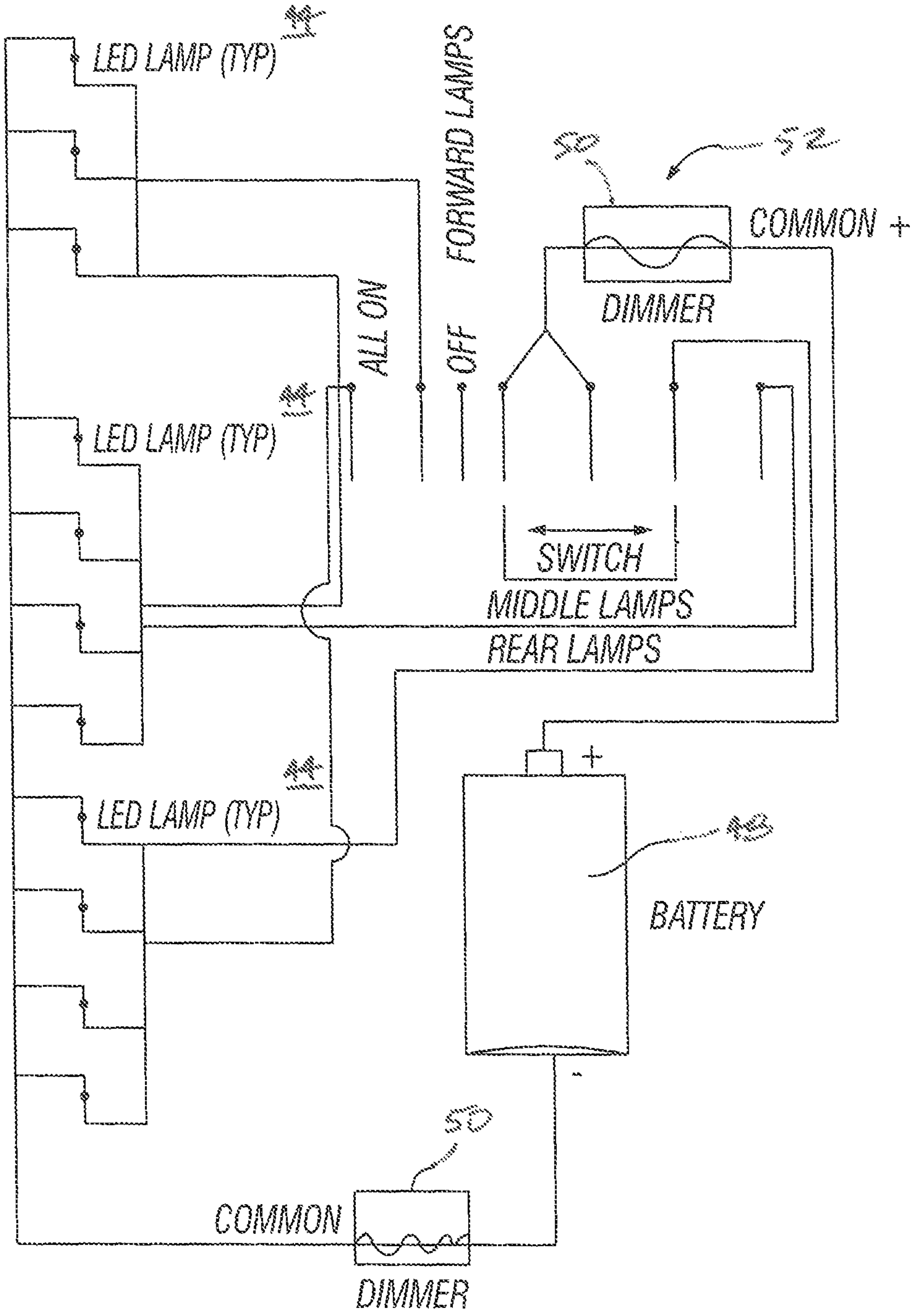
FIG. 5 is a first example circuit diagram used with an example light assembly as disclosed herein.
Figure 6:
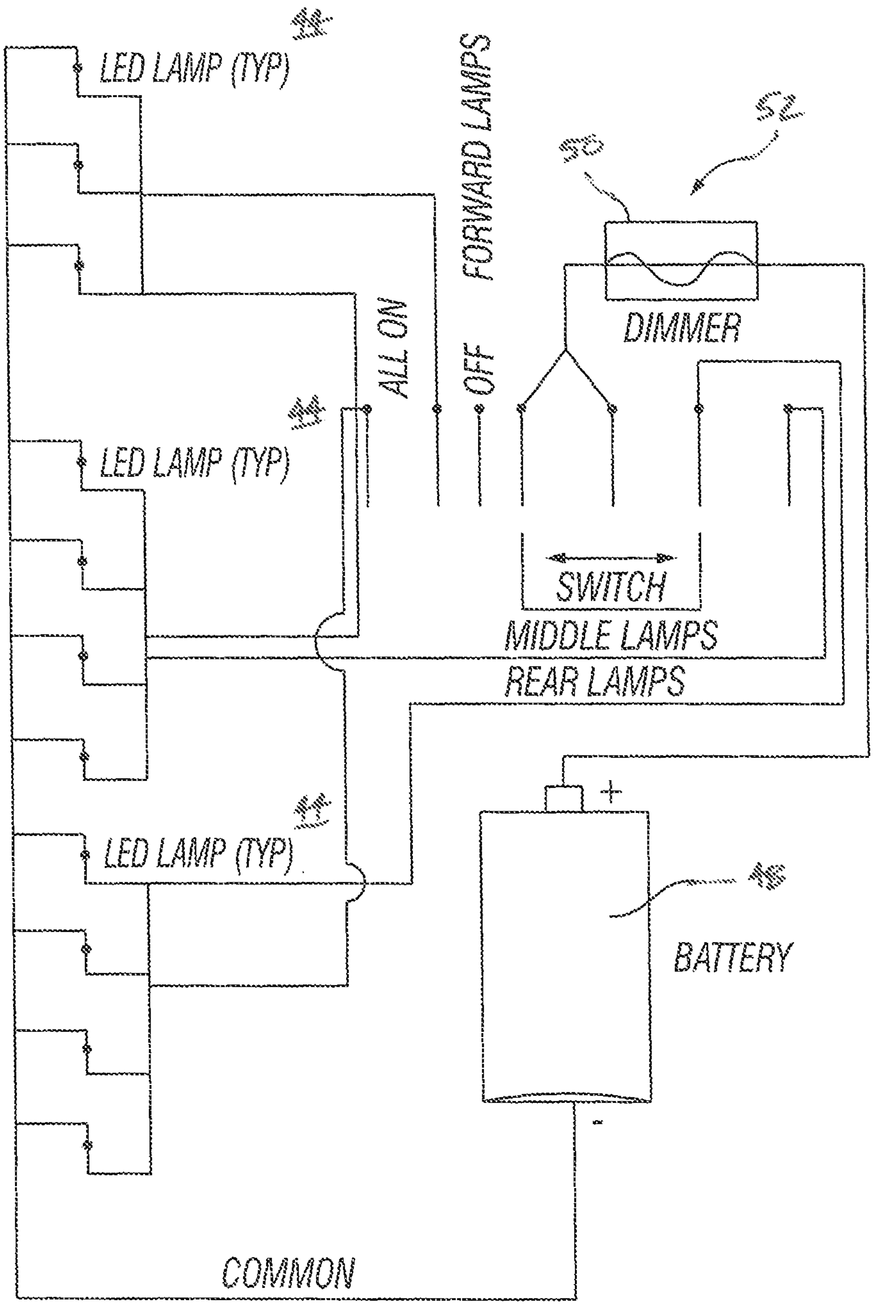
FIG. 6 is a second example circuit diagram used with an example light assembly as disclosed herein.

As shown in FIGS. 5 and 6, the circuitry 52 comprises one or more dimmer switchs 50 that control the intensity of the electricity to each bulb so as to vary the degree of light intensity to each of the bulbs 44. This allows either side bulbs to be activated for viewing only the sides without light diffused from the center bulb which may interfere with sight.

The transparent cover or lens 38 may comprise convex exiting lens which act with the reflectors to form a concentrated light beam to each side 54 and front of the flashlight.

Figure 7:
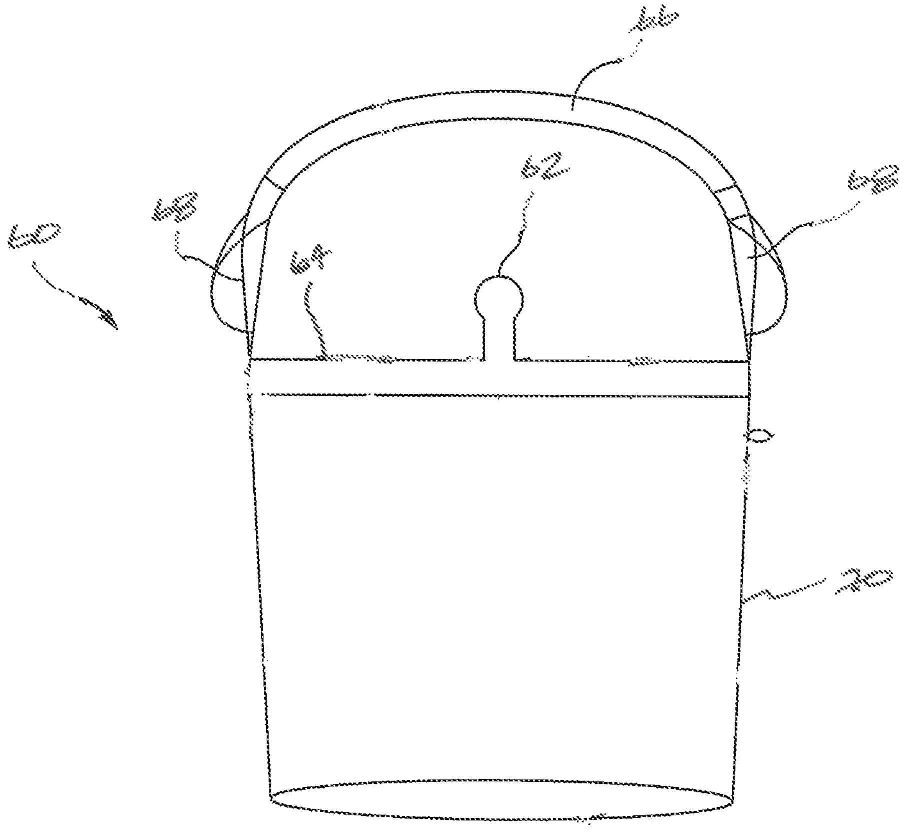
FIG. 7 is a top elevation is partial cross-section of an example light assembly as disclosed herein.

FIG. 7 illustrates an example light emitting assembly 60 that is somewhat similar to that illustrated in FIG. 4, except that it comprises a single light emitting element 62, and a reflector 64 that is configured to direct the light emitted from the light emitting element 62 outwardly through the transparent lens 66 through the front and sides 68 of the lens to produce a 180 degree or more field of illumination as measured relative to an axis running longitudinally or axially through the light assembly housing 70.

A feature of light assemblies as disclosed herein is that they as specially constructed to produce a multi-directional field of illumination that is greater than about 90 degrees, in the range of from about 120 to 270 degrees, and preferably 180 degrees or more. In some example embodiments, the field of illumination may be from 180 to 270 degrees, or from 180 degrees to 360 degrees, depending on the particular end-use application.

While examples have been disclosed and illustrated comprising a transparent lens that has a convex configuration to enable transmission of light from the light emitting element (s) outwardly from the assembly to provide the desired field of illumination, it is to be understood that the light assembly can be configured other than as described or illustrated and yet produce the desired field of illumination.

Figure 8:
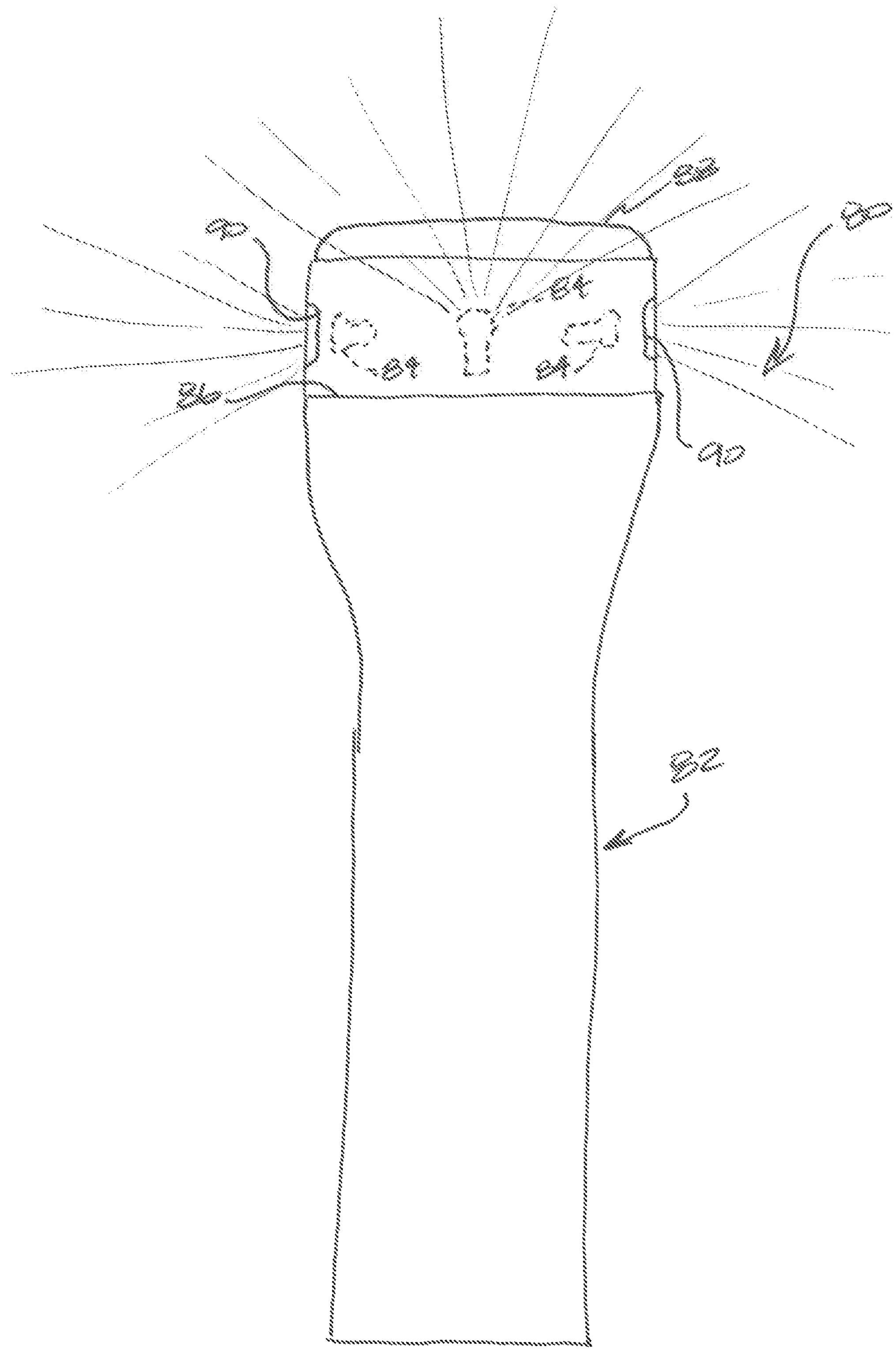
FIG. 8 is a side view of an example light assembly as disclosed herein.

FIG. 8 for example illustrates a light assemblies embodiment 80 as disclosed herein comprising a housing 82 and one or more light emitting element(s) 84 disposed adjacent an end 86 of the housing. In this particular embodiment, a transparent lens or cover 88 is positioned adjacent the housing end 86 to facilitate the transmission of light from within the assembly in a forward direction. Additionally, the housing 82 includes one or more openings or slots 90 extending through a sidewall portion, wherein the slots are positioned and configured to permit the passage of light (from the one or more light emitting element(s) 84) through sides of the housing to thereby provide the desired field of illumination as disclosed herein. In such example, the number, size, shape, and position of the slots can vary as useful to provide the desired field of illumination.

Although light assemblies described in terms of certain embodiments, other embodiments apparent to those of ordinary skill in the art also are within the scope of light assemblies as disclosed herein. Thus, various changes and modifications may be made without departing from the spirit and scope of such light assemblies. For instance, various components may be repositioned, reconfigured, and/or resized as desired. Moreover, not all of the features, aspects and advantages are necessarily required to practice light assemblies as disclosed herein. Accordingly, the scope of light assemblies as disclosed herein is intended to be defined only by the claims that follow.

What is claimed is:

1. A light assembly comprising:

a housing having an opening at one end of the housing; and more than one light emitting elements disposed in the housing adjacent the opening;

wherein at least one of the light emitting elements is positioned away from a center of the housing, and wherein the more than one light emitting elements emit a field of illumination outwardly from the housing opening of 90 degrees or more as measured relative to an axis that extends outwardly from the housing opening and that is oriented perpendicular to the housing opening.

2. The light assembly as recited in claim 1, wherein a first light emitting element is positioned adjacent the center of the housing and emits light in a forward direction outwardly from the housing opening, and wherein a second light emitting element is positioned a distance from the first light element adjacent a first side of the housing and emits light in a first sideward direction outwardly from the first side of the housing opening, wherein an optical axis of light emitted from the housing by the first light emitting element is different than an optical axis of light emitted from the housing by the second light emitting element.

3. The light assembly as recited in claim 1, comprising a cover connected with the housing opening and positioned adjacent at least one of the light emitting elements, wherein the cover is configured to permit transmission of light produced by the at least one of the light emitting elements outwardly from the housing.

4. The light assembly as recited in claim 1, wherein the light emitting elements are arranged to emit a field of illumination outwardly from the housing opening of about 120 to 270 degrees.

5. The light assembly as recited in claim 1, wherein a first light emitting element is positioned to provide a frontward field of illumination from the housing opening, and wherein a second light emitting element is positioned to provide a first sideward field of illumination from the housing opening in a direction different from the frontward field of illumination.

6. The light assembly as recited in claim 5, wherein a third light emitting element is positioned to provide a second sideward field of illumination from the housing opening in a direction different than the first sideward field of illumination and the frontward field of illumination.

7. The light assembly as recited in claim 6, wherein one or more of the first, second, and third light emitting elements are positioned adjacent each other.

8. A multi-directional light apparatus comprising:

a housing comprising two or more light emitting elements disposed therein and distanced apart from one another;

wherein at least one of the light emitting elements is positioned adjacent a center of a front portion of the housing and emits a frontward field of illumination outwardly from the housing, wherein at least another one of the light emitting elements is positioned away from the center and adjacent a side of the front portion of the housing to emit a sideward field of illumination outwardly from the housing in a direction different from the forward frontward field of illumination, and wherein the light emitting elements emit a field of illumination outwardly from the housing that is 90 degrees or more as measured relative to an axis extending outwardly from the housing that is oriented perpendicular to the front portion of the housing.

9. The multi-directional light apparatus as recited in claim 8, wherein the light emitting elements emit a field of illumination outwardly from the front portion of the housing that is 180 degrees or more.

10. The multi-directional light apparatus as recited in claim 8, wherein the light emitting elements emit a field of illumination outwardly from the front portion of the housing that is between 120 to 270 degrees.

11. The multi-directional light apparatus as recited in claim 8, comprising a reflector that is positioned adjacent at least one of the two or more light emitting elements.

12. The multi-directional light apparatus as recited in claim 8, wherein the sideward field of illumination projects light outwardly from the housing along a first optical axis, and wherein least another one of the light emitting elements is positioned away from the center and adjacent another a side of the front portion of the housing to emit a another sideward field of illumination that projects light outwardly from the housing along a second optical axis that is different from the first optical axis.

13. The multi-directional light apparatus as recited in claim 8, wherein at least one of the light emitting elements is disposed adjacent an opening adjacent the housing front portion.

14. The multi-directional light apparatus as recited in claim 8, wherein the multi-directional light assembly is a portable device that is configured to electrically connect with and accommodate a portable power source.

15. The multi-directional light apparatus as recited in claim 14, wherein the multi-directional light assembly is configured to promote hand-held operation by a user.

16. A light assembly having a wide field of illumination comprising a housing that is configured to accommodate placement of more than one light emitting elements along a front portion of the housing, wherein at least two or more of the light emitting elements provide a frontward field of illumination and a sideward field of illumination in a direction different than the frontward field of illumination, and wherein the light emitting elements emit a wide field of illumination outwardly from the front portion of the housing that is 180 degrees or more as measured relative to an axis that extends outwardly from the front portion of the housing and that is perpendicular to the front portion of the housing.

17. The light assembly as recited in claim 16, wherein the light emitting elements emit a wide field of illumination outwardly from the front portion of the housing of between 120 and 270 degrees.

18. The light assembly as recited in claim 16, wherein one of the light emitting elements is positioned adjacent a center of the housing and emits the frontward field of illumination, and wherein another one of the light emitting elements is positioned at a location different than the center of the housing and emits the sideward field of illumination.

19. The light assembly as recited in claim 16, wherein at least one of the light emitting elements is disposed adjacent an opening of the housing along the front portion of the housing, and wherein the light assembly comprises a cover attached with the housing opening that is configured to permit transmission of light produced by the at least one of the light emitting elements outwardly from the housing.

20. The light assembly as recited in claim 16, wherein the housing includes one of the light emitting elements positioned adjacent a center of the front portion of the housing, includes another of the light emitting elements positioned adjacent a first side of the front portion of the housing away from the center, and includes another of the light emitting elements positioned adjacent a second side of the front portion of the housing that is away from the center and different than the first side.

21. A light assembly comprising:

a housing having an opening; and more than one light emitting elements disposed in the housing;

wherein the more than one light emitting elements are distanced apart from one another inside the housing and provide light that is emitted outwardly from the housing in different directions producing a combined field of illumination outwardly from the housing of 90 degrees or more as measured relative to an axis that extends outwardly from the housing opening and that is oriented perpendicular to the housing opening.

22. The light assembly as recited in claim 21, wherein the light emitting element comprises:

a first light emitting element positioned adjacent a center of the housing that emits a forward directed field of illumination outwardly from the housing;

a second light emitting element positioned adjacent a first side of the first light emitting element that emits a first sideward field of illumination outwardly from the housing; and a third light emitting element positioned adjacent a second side of the first light emitting element that is opposite the first side and that emits a second sideward field of illumination outwardly from the housing;

wherein each of the forward directed field of illumination, the first sideward field of illumination, and the second sideward field of illumination are directed outwardly from the housing in different directions from one another.

23. The light assembly as recited in claim 21 providing a combined field of illumination outwardly from the housing of between 120 to 270 degrees.

24. The light assembly as recited in claim 21 providing a combined field of illumination outwardly from the housing of 180 degrees or more.

* * * * *